United States Patent
Itoh et al.

(10) Patent No.: US 10,737,357 B2
(45) Date of Patent: Aug. 11, 2020

(54) BRAZING SHEET, MANUFACTURING METHOD THEREOF, AND ALUMINUM STRUCTURE BRAZING METHOD

(71) Applicant: UACJ Corporation, Tokyo (JP)

(72) Inventors: Yasunaga Itoh, Aichi (JP); Shoichi Sakoda, Aichi (JP); Atsushi Fukumoto, Aichi (JP)

(73) Assignee: UACJ CORPORATION, Tokyo (JP)

( * ) Notice: Subject to any disclaimer, the term of this patent is extended or adjusted under 35 U.S.C. 154(b) by 131 days.

(21) Appl. No.: 16/304,467

(22) PCT Filed: May 24, 2017

(86) PCT No.: PCT/JP2017/019409
§ 371 (c)(1),
(2) Date: Nov. 26, 2018

(87) PCT Pub. No.: WO2017/208940
PCT Pub. Date: Dec. 7, 2017

(65) Prior Publication Data
US 2019/0291218 A1    Sep. 26, 2019

(30) Foreign Application Priority Data

May 30, 2016 (JP) .................................. 2016-107426

(51) Int. Cl.
*B23K 1/00*    (2006.01)
*B23K 35/02*    (2006.01)
(Continued)

(52) U.S. Cl.
CPC ............ *B23K 35/0238* (2013.01); *B23K 1/00* (2013.01); *B23K 1/19* (2013.01); *B23K 1/203* (2013.01);
(Continued)

(58) Field of Classification Search
CPC ............ B23K 35/0233; B23K 35/0238; B23K 35/286; B23K 1/00; B23K 35/28;
(Continued)

(56) References Cited

U.S. PATENT DOCUMENTS 4,888,218 A    12/1989 Suzuki et al.
5,148,862 A     9/1992 Hashiura et al.
(Continued)

FOREIGN PATENT DOCUMENTS

CN    1652925 A    8/2005    ............. B32B 15/20
CN    1652925 A    8/2005
(Continued)

OTHER PUBLICATIONS

Office Action and Search Report dispatched from the Chinese Patent Office dated Feb. 3, 2020 in related Chinese application No. 201780026889.2, and machine translation thereof.
(Continued)

*Primary Examiner* — Kiley S Stoner
(74) *Attorney, Agent, or Firm* — J-TEK Law PLLC; Jeffrey D. Tekanic; Scott T. Wakeman

(57) ABSTRACT

A brazing sheet is provided for use in brazing performed in an inert gas atmosphere both using flux and without using flux. The brazing sheet includes an aluminum-based core, an intermediate material layered on the core and being composed of an aluminum alloy that contains Mg: 0.40-3.0 mass %, and a filler metal layered on the intermediate material and being composed of an aluminum alloy that contains Si: 6.0-13.0 mass % and Mg: less than 0.050 mass %. The brazing sheet satisfies the formula below where M [mass %] is the Mg content in the intermediate material, ti [μm] is the thickness of the intermediate material, and tf [μm] is the thickness of the filler metal:

$tf \geq 10.15 \times \ln(M \times ti) + 3.7$.

17 Claims, 2 Drawing Sheets

(51) Int. Cl.
  *B23K 1/20*   (2006.01)
  *B23K 35/28*  (2006.01)
  *B32B 15/01*  (2006.01)
  *C22C 21/02*  (2006.01)
  *C22C 21/06*  (2006.01)
  *C23F 1/20*   (2006.01)
  *B23K 31/02*  (2006.01)
  *B23K 35/22*  (2006.01)
  *C22C 21/00*  (2006.01)
  *B23K 1/19*   (2006.01)
  *B23K 103/10* (2006.01)

(52) U.S. Cl.
  CPC .............. *B23K 31/02* (2013.01); *B23K 35/22* (2013.01); *B23K 35/28* (2013.01); *B23K 35/288* (2013.01); *B32B 15/016* (2013.01); *C22C 21/00* (2013.01); *C22C 21/02* (2013.01); *C22C 21/06* (2013.01); *C23F 1/20* (2013.01); *B23K 1/0012* (2013.01); *B23K 2103/10* (2018.08)

(58) Field of Classification Search
  CPC .......... B23K 31/02; B23K 35/22; B23K 1/19; B23K 1/203; B23K 35/288; B23K 2103/10; B23K 2101/14; B23K 1/0012; C22C 21/00; C22C 21/02; C22C 21/06; B32B 15/016; C23F 1/20
  USPC ............................. 228/183, 56.3, 245–255
  See application file for complete search history.

(56) References Cited

U.S. PATENT DOCUMENTS

| | | | |
|---|---|---|---|
| 6,059,174 A | 5/2000 | Kojima et al. | |
| 6,063,510 A * | 5/2000 | Inabayashi | B23K 35/286 428/654 |
| 8,763,880 B2 * | 7/2014 | Wittebrood | C22C 21/02 228/56.3 |
| 9,033,206 B2 * | 5/2015 | Edo | B23K 1/19 228/183 |
| 9,364,913 B2 * | 6/2016 | Takewaka | B23K 1/0012 |
| 9,976,200 B2 * | 5/2018 | Ando | B23K 1/00 |
| 9,976,201 B2 * | 5/2018 | Ando | B21B 1/22 |
| 10,099,320 B2 * | 10/2018 | Kamiya | B23K 1/19 |
| 10,300,563 B2 * | 5/2019 | Itoh | B23K 1/19 |
| 10,384,312 B2 * | 8/2019 | Ishigami | B23K 35/0238 |
| 10,478,925 B2 * | 11/2019 | Izumi | B23K 35/22 |
| 10,518,363 B2 * | 12/2019 | Yoshino | F28F 19/06 |
| 2002/0034653 A1 | 3/2002 | Okamoto et al. | |
| 2002/0037426 A1 * | 3/2002 | Yamada | F28F 21/089 428/654 |
| 2004/0035911 A1 * | 2/2004 | Dockus | F28F 21/084 228/56.3 |
| 2004/0121180 A1 * | 6/2004 | Wittebrood | B32B 15/012 428/652 |
| 2004/0131879 A1 * | 7/2004 | Wittebrood | B32B 15/012 428/650 |
| 2004/0238604 A1 * | 12/2004 | Hasegawa | B23K 1/203 228/248.1 |
| 2004/0238605 A1 * | 12/2004 | Nishimura | B23K 35/286 228/264 |
| 2005/0064226 A1 * | 3/2005 | Benedictus | B32B 15/016 428/654 |
| 2006/0081682 A1 | 4/2006 | Doko et al. | |
| 2007/0017605 A1 | 1/2007 | Nakamura et al. | |
| 2009/0162686 A1 | 6/2009 | Matsukado et al. | |
| 2009/0165901 A1 | 7/2009 | Koshigoe et al. | |
| 2010/0147500 A1 | 6/2010 | Minami et al. | |
| 2010/0183897 A1 | 7/2010 | Kobayashi et al. | |
| 2011/0204124 A1 * | 8/2011 | Wittebrood | B23K 1/0012 228/219 |
| 2011/0240280 A1 | 10/2011 | Izumi et al. | |
| 2012/0045660 A1 | 2/2012 | Matsukado et al. | |
| 2012/0129003 A1 * | 5/2012 | Ando | B23K 35/0238 428/654 |
| 2012/0177947 A1 * | 7/2012 | Abrahamsson | B32B 15/016 428/654 |
| 2013/0260175 A1 | 10/2013 | Kimura et al. | |
| 2015/0017470 A1 | 1/2015 | Edo et al. | |
| 2015/0037607 A1 * | 2/2015 | Itoh | F28F 21/089 428/654 |
| 2015/0118517 A1 | 4/2015 | Itoh et al. | |
| 2015/0165564 A1 | 6/2015 | Ahl et al. | |
| 2015/0203934 A1 | 7/2015 | Oskarsson et al. | |
| 2015/0321293 A9 | 11/2015 | Itoh et al. | |
| 2016/0031045 A1 | 2/2016 | Izumi et al. | |
| 2016/0161199 A1 * | 6/2016 | Ando | C22C 21/10 165/133 |
| 2016/0319401 A1 * | 11/2016 | Ando | B23K 1/19 |
| 2017/0045316 A1 | 2/2017 | Terayama et al. | |
| 2017/0151638 A1 | 6/2017 | Itoh et al. | |
| 2017/0173741 A1 * | 6/2017 | Matsumoto | B32B 15/20 |
| 2017/0304956 A1 | 10/2017 | Itoh et al. | |
| 2017/0320170 A1 * | 11/2017 | Yanagawa | B23K 35/0238 |
| 2018/0133845 A1 | 5/2018 | Itoh et al. | |
| 2018/0141166 A1 | 5/2018 | Itoh et al. | |
| 2018/0169797 A1 * | 6/2018 | Izumi | B23K 35/0238 |
| 2018/0169798 A1 * | 6/2018 | Izumi | B23K 35/288 |
| 2018/0193961 A1 * | 7/2018 | Asano | C22C 21/02 |
| 2018/0200841 A1 * | 7/2018 | Itoh | B23K 1/0012 |
| 2018/0200842 A1 * | 7/2018 | Itoh | B23K 35/28 |
| 2018/0214964 A1 * | 8/2018 | Itoh | B23K 35/0222 |
| 2018/0290245 A1 * | 10/2018 | Itoh | B32B 15/016 |
| 2018/0297138 A1 * | 10/2018 | Yamayoshi | B23K 35/288 |
| 2018/0304415 A1 * | 10/2018 | Yamayoshi | C22C 21/02 |
| 2018/0326540 A1 * | 11/2018 | Desikan | B23K 1/0012 |
| 2019/0099841 A1 * | 4/2019 | Narita | C22F 1/04 |
| 2019/0118311 A1 * | 4/2019 | Kimura | B23K 35/0238 |
| 2020/0086429 A1 * | 3/2020 | Baumann | C22C 21/06 |

FOREIGN PATENT DOCUMENTS

| | | | |
|---|---|---|---|
| CN | 104395028 A | 3/2015 | ............ B23K 1/012 |
| CN | 104395028 A | 3/2015 | |
| JP | H05214475 A | 8/1993 | |
| JP | 2000303132 A | 10/2000 | |
| JP | 2002273598 A | 9/2002 | |
| JP | 2004025297 A | 1/2004 | |
| JP | 2004358519 A | 12/2004 | |
| JP | 2013001941 A | 1/2013 | |
| JP | 2013220434 A | 10/2013 | |
| JP | 2013233552 A | 11/2013 | |
| JP | 2014073519 A | 4/2014 | |
| JP | 2014176892 A | 9/2014 | |
| JP | 2015030861 A | 2/2015 | |
| JP | 2015033716 A | 2/2015 | |
| JP | 2015528852 A | 10/2015 | |
| JP | 2016215248 A | 12/2016 | |
| JP | 2017018996 A | 1/2017 | |
| JP | 2017029989 A | 2/2017 | |
| WO | 03089237 A1 | 10/2003 | |
| WO | 2013168669 A1 | 11/2013 | |
| WO | 2014097820 A1 | 6/2014 | |
| WO | WO-2015146322 A1 * | 10/2015 | ............ C22C 21/12 |
| WO | 2016056306 A1 | 4/2016 | |
| WO | WO-2016052366 A1 * | 4/2016 | ............ C22C 21/10 |
| WO | WO2016056306 A1 | 4/2016 | ............ B23K 35/22 |

OTHER PUBLICATIONS

English translation of the International Search Report dated Dec. 7, 2017 for parent application No. PCT/JP2017/019409.
English translation of the Written Opinion of the International Searching Authority for parent application No. PCT/JP2017/019409.

* cited by examiner

BRAZING SHEET, MANUFACTURING METHOD THEREOF, AND ALUMINUM STRUCTURE BRAZING METHOD

CROSS-REFERENCE

This application is the US national stage of International Patent Application No. PCT/JP2017/019409 filed on May 24, 2017, which claims priority to Japanese Patent Application 2016-107426 filed on May 30, 2016.

TECHNICAL FIELD

The present invention relates to a brazing sheet, to a manufacturing method thereof, and to an aluminum structure brazing method that includes such a brazing sheet.

BACKGROUND ART

Aluminum products, such as, e.g., heat exchangers, machine components, etc., include a large number of components made of aluminum material (including aluminum and aluminum alloys, likewise hereinbelow). These components are often brazed using a brazing sheet that includes a core and a filler metal provided on at least one side of the core. Flux brazing methods, in which brazing is performed by applying flux to a surface of a join part, are widely used as brazing methods for aluminum materials.

In flux brazing methods, a flux that functions to break up oxide films on the surface of the aluminum material is applied to the join part in advance. Then, brazing is carried out by heating the object to be processed in an inert gas atmosphere, such as nitrogen gas or the like. Fluoride-based fluxes containing KF (potassium fluoride), $AlF_3$ (aluminum fluoride), CsF (cesium fluoride), LiF (lithium fluoride), etc. are used as the flux.

However, in flux brazing methods, flux and flux residue remain adhered to the surface(s) of the aluminum products after brazing has been completed. This flux and flux residue sometimes cause problems depending on the usage of the aluminum products. For example, in heat exchangers having electronic parts mounted thereon, there is a risk that problems will occur, such as deterioration of surface treatability during manufacture owing to the flux residue. Further, there is a risk that problems will arise during usage of the heat exchanger, such as clogging caused by the flux, etc., in the refrigerant passageways. Moreover, it is necessary to perform a pickling treatment in order to remove flux and flux residue; in recent years, the cost burden of this processing has been regarded as a problem.

Accordingly, in order to avoid the above-mentioned problems associated with the usage of flux, so-called fluxless brazing methods have been proposed, in which brazing is performed without applying flux onto the surface(s) of the join part(s). Brazing sheets having a filler metal containing Mg (for example, Patent Document 1) are used in fluxless brazing methods. Mg forms a spinel-type oxide ($MgAl_2O_4$) on the surface of the brazing sheet during the brazing heating. Brazing can be performed without using flux owing to this oxide embrittling the oxide film present on the join part(s).

PRIOR ART LITERATURE

Patent Document

Patent Document 1: JP-A-2014-73519

SUMMARY OF THE INVENTION

However, compared to flux brazing methods, fluxless brazing methods are problematic in that the quality of the brazed joint is easily degradable depending on the shape and structure of the object to be processed and the location at which the brazed joint forms. For example, when brazing of a hollow structure is performed using a fluxless brazing method, there is a risk that filler produced by the heating will be drawn into the interior of the hollow structure and a joint defect, such as fillet tearing, on the exterior of the hollow structure will occur.

In order to improve brazeability while taking advantage of a reduction of flux residue by using a fluxless brazing method, for example, a method is conceivable, in which flux is applied sectionally to parts where brazeability easily degrades. However, there is a problem with commonly-used fluoride-based fluxes in that the activity of the flux markedly deteriorates owing to a reaction of KF and/or $AlF_3$ in the flux with Mg in the filler metal. In addition, when Mg reacts with KF or the like, not only the effect of improved brazeability owing to the flux decreases, but also a problem arises in that solid compounds produced by the reaction with KF, etc., form dust and thereby impair the working environment.

From such a background, it has been strongly desired to develop a brazing sheet that can improve the brazeability of aluminum structures, in which flux has been applied sectionally, in other words, a brazing sheet that can be used both in flux brazing and fluxless brazing. In addition, such a brazing sheet can be used not only in so-called sectional fluxless brazing performed by sectionally applying a flux, but also in any brazing method, such as complete flux brazing, in which flux is applied to the entire join part, and complete fluxless brazing performed without applying flux at all, thereby becoming applicable to an extremely wide range of uses.

The present invention has been made in view of such a background, and it is intended to provide a brazing sheet applicable to both brazing performed using a flux and brazing performed without using a flux, to a manufacturing method thereof, and to a brazing method performed using this brazing sheet.

One aspect of the present invention is a brazing sheet applicable to brazing performed in an inert gas atmosphere both using flux and without using flux, the brazing sheet including:

a core composed of an aluminum material;

an intermediate material layered on the core and having a chemical composition that contains Mg: 0.40-3.0 mass %, the remainder being Al and unavoidable impurities; and a filler metal layered on the intermediate material and having a chemical composition that contains Si: 6.0-13.0 mass %, and Mg is restricted to less than 0.050 mass %, the remainder being Al and unavoidable impurities, wherein the brazing sheet satisfies the relation of below formula (1) where the Mg content in the intermediate material is represented by M [mass %], the thickness of the intermediate material is represented by $t_i$ [μm], and the thickness of the filler metal is represented by $t_f$ [μm].

$$t_f \geq 10.15 \times \ln(M \times t_i) + 3.7 \quad (1)$$

Another aspect of the present invention is a method for manufacturing the brazing sheet of the above-mentioned aspect, including:

preparing a clad sheet having the above-mentioned layered structure; and etching the clad sheet with acid or alkali.

Still another aspect of the present invention is a method for brazing an aluminum structure having the brazing sheet of the above-mentioned aspect, including:

assembling an object to be processed that includes the aluminum structure, which includes the brazing sheet, and a fluoride-based flux applied to one section of a join part in the aluminum structure, and brazing the object in an inert gas atmosphere.

The brazing sheet has the intermediate material and the filler metal, which have the above-specified chemical compositions, on one side or both sides of the core. Furthermore, the brazing sheet satisfies the relation of formula (1) where the Mg content in the intermediate material is represented by M [mass %], the thickness of the intermediate material is represented by $t_i$ [μm], and the thickness of the filler metal is represented by $t_f$ [μm]. By setting the Mg content M [mass %] in the intermediate material, the thickness $t_i$ [μm] of the intermediate material, and the thickness of $t_f$ [μm] filler metal so as to satisfy the relation of the formula (1) in addition to specifying the chemical compositions of the core, the intermediate material and the filler metal of the brazing sheet, the brazeability of an object to be processed, on which a flux has been applied sectionally, can be improved.

In other words, when brazing of the aluminum structure having the brazing sheet is performed, first the object to be processed, which includes the aluminum structure having the brazing sheet and the fluoride-based flux applied to one section of a join part or join parts in the aluminum structure, is assembled. When the object is heated in an inert gas atmosphere, Mg in the intermediate material gradually diffuses toward the surface of the brazing sheet.

When the temperature of the join part(s) reaches approximately 562° C., which is the melting point of the fluoride-based flux, the flux starts to melt and break up the oxide film. By setting the thickness of the filler metal of the brazing sheet within the above-specified range, the amount of Mg, which has reached the surface at the time when the flux starts to melt, can be reduced in comparison with previously-existing brazing sheets. For this reason, a reaction between the flux and Mg at the join part(s), to which the flux was applied, can be inhibited. As a result, satisfactory fillets can be formed.

On the other hand, Mg of high concentration, which has permeated from the intermediate material into the filler metal, forms an Al—Mg—Si ternary eutectic together with Si in the filler metal. Thus, the filler metal starts to locally melt at about 565° C., which is slightly higher than the melting point of the flux. When the temperature rises further and reaches 570-577° C., the rate of Mg diffusion into the filler metal rapidly increases.

Then, at the join part(s) to which the flux is not applied, a large amount of Mg reaches the surface of the brazing sheet after brazing has started owing to the flux, and an oxide film present at the above-mentioned join part(s) is embrittled all at once. Consequently, satisfactory fillets can be formed without using the flux.

In this way, according to the brazing sheet, it is possible in the brazing of an aluminum structure to which flux is applied sectionally, to improve the brazeability of both the join part(s), to which the flux is applied, and the join part(s) to which the flux is not applied.

DETAILED DESCRIPTION

Figure 1:
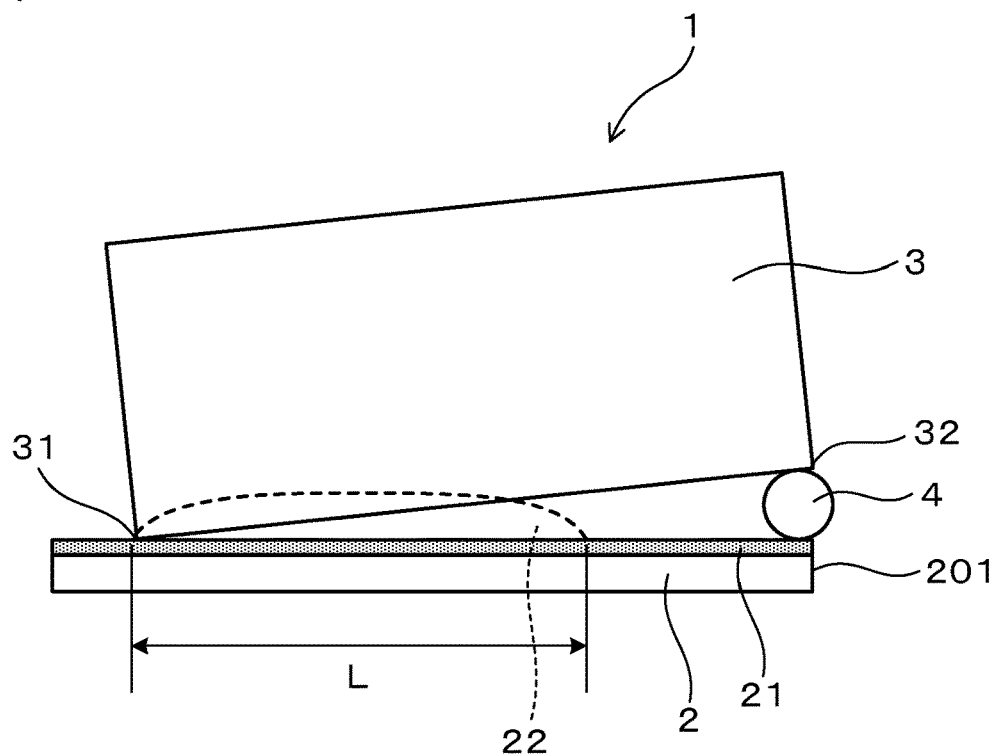
FIG. 1 is a side elevation view of a test specimen for a gap filling test in Working Example 1.

In the brazing sheet, the intermediate material and the filler metal may be provided on at least one side of the core. The core may have a known filler metal and/or a sacrificial anode material provided on the side where neither the intermediate material nor the filler metal is provided.

It is also possible to provide the intermediate material and the filler metal on both sides of the core. In this case, it is preferable to set the Mg content M [mass %] in the intermediate material, the thickness $t_i$ [μm] of the intermediate material and the thickness $t_f$ [μm] of the filler metal so as to satisfy formula (1) on each side.

<Core>

The core may have a chemical composition containing, for example, Mg: 0.20-0.80 mass %, the remainder being composed of Al and unavoidable impurities. Mg in the core diffuses toward the surface of the brazing sheet owing to the heating of the brazing and promotes the embrittlement of the oxide film by Mg. As a result, brazeability at a join part or join parts, to which flux is not applied, can be further improved.

Further, Mg in the core is effective to increase the amount of Mg diffusing to the surface of the material in a temperature range of 570° C. or higher; in particular, it remarkably influences an increase of the Mg diffusion amount in case the temperature increase rate is slow.

From the viewpoint of sufficiently achieving the above-mentioned effect, the Mg content in the core is preferably set to 0.20 mass % or more. On the other hand, in case the Mg content is excessively high, it is difficult to obtain an effect commensurate with the contained amount. In addition, in this case, there is a risk that restrictions have to be placed on the chemical composition(s) of the intermediate material and/or the filler metal in order to avoid that the amount of Mg diffusing to the brazing sheet surface becomes excessive. From the viewpoint of avoiding these problems, it is preferable to set the Mg content in the core to 0.80 mass % or less.

In addition, the core may further contain one or two or more from among Mn (manganese): 1.8 mass % or less, Si: 1.2 mass % or less, Fe (iron): 1.0 mass % or less, Cu (copper): 1.5 mass % or less, Zn (zinc): 0.8 mass % or less, Ti (titanium): 0.2 mass % or less, and Zr (zirconium): 0.5 mass % or less as needed. These elements can be appropriately selected, for example, depending on the mechanical properties, etc., required for the aluminum structure after brazing.

<Intermediate Material>

The intermediate material is layered on the core, and has a chemical composition containing Mg: 0.40-3.0 mass %, the remainder being composed of Al and unavoidable impurities.

Mg (Magnesium): 0.40-3.0 Mass %

By setting the Mg content in the intermediate material to the above-specified range, brazeability can be improved both at a join part or join parts, to which flux is applied, and at a join part or join parts, to which flux is not applied. In case the Mg content in the intermediate material is less than 0.40 mass %, there is a risk that the brazeability of a join part or join parts, to which flux is not applied, will decrease, because the amount of Mg that reaches the surface of the brazing sheet is insufficient. On the other hand, in case the Mg content in the intermediate material is more than 3.0 mass %, it leads to a degradation of the brazeability at a join part or join parts, to which flux is applied, because the amount of Mg that reaches the surface of the brazing sheet becomes excessive.

The intermediate material may further contain one or two or more from among Si, Zn, Be, and Bi, as needed.

Si (Silicon): 3.0-12.0 Mass %

By adding Si to the intermediate material, the diffusion rate of Mg in the intermediate material can be increased during heating in a temperature range of 570° C. or higher. Furthermore, by adding Si to the intermediate material, the intermediate material can melt simultaneously with the filler metal and a large amount of Mg can be supplied to the surface of the brazing sheet simultaneously with the melting start of the filler metal. This result is effective for improving the brazeability at a join part or join parts, to which flux is not applied, and exhibits superior effects especially when the heating rate is high.

From the viewpoint of sufficiently achieving the above-mentioned effects, it is preferable to set the Si content in the intermediate material to 3.0 mass % or more. On the other hand, in case the Si content is excessively high, it is difficult to obtain effects commensurate with the contained amount, and coarse Si particles tend to generate. From the viewpoint of avoiding these problems, it is preferable to set the Si content to 2.0 mass % or less.

Zn (Zinc): 0.90-6.0 Mass %

By adding Zn to the intermediate material, the intermediate material is caused to function as a sacrificial anode material and corrosion resistance after brazing can be improved. By setting the Zn content in the intermediate material to 0.90 mass % or more, the effect of improving the corrosion resistance can be sufficiently achieved. On the other hand, in case the Zn content is excessively high, permeation of molten filler metal into the intermediate material tends to occur because the melting point of the intermediate material is lowered. As a result, there is a risk that the brazeability will degrade. From the viewpoint of avoiding degradation of the brazeability, it is preferable to set the Zn content to 6.0 mass % or less.

It is noted that in case Si is contained in the intermediate material, the intermediate material functions also as a filler metal in some cases. In this case, if even more Zn is included in the intermediate material, the molten filler metal will contain a high concentration of Zn. For this reason, there is a risk that preferential corrosion will occur in the fillets formed by such a filler metal and deterioration of the corrosion resistance will be caused. In order to avoid such a problem, in case either one of Si and Zn is included in the intermediate material, it is preferable to avoid the addition of the other one of Si and Zn.

Be (Beryllium): 0.050-0.20 Mass %

Be in the intermediate material diffuses toward the surface of the brazing sheet during heating at the time of brazing and can form an oxide containing Be in the oxide film composed of $Al_2O_3$. This oxide has an effect that embrittles the oxide film. By setting the Be content to 0.050 mass % or more, the effect of the above-mentioned oxide can be sufficiently obtained and brazeability can be further improved. On the other hand, in case the Be content is excessively high, the amount of the oxide becomes excessively high and there is a risk that instead degradation of the brazeability will be caused. From the viewpoint of avoiding such a problem, it is preferable to set the Be content to 0.20 mass % or less.

Bi (Bismuth): 0.050-0.30 Mass %

Bi in the intermediate material diffuses toward the surface of the brazing sheet during heating at the time of brazing. Then, when the molten filler metal forms, it exhibits the function of lowering the surface tension thereof. By setting the Bi content to 0.050 mass % or more, the surface tension of the molten filler metal can be sufficiently lowered and brazeability can be further improved. On the other hand, in case the Bi content is excessively high, there is a risk that a tenacious oxide film will form on the surface of the brazing sheet in the manufacturing process thereof, and/or reoxidation will tend occur during the brazing heating. Therefore, in case the Bi content is excessively high, there is a risk that instead degradation of the brazeability will be caused. From the viewpoint of avoiding the degradation of the brazeability, it is preferable to set the Bi content to 0.30 mass % or less.

<Filler Metal>

The filler metal is layered on the intermediate material, and has a chemical composition that contains Si: 6.0-13.0 mass %, and Mg is restricted to less than 0.050 mass %, the remainder being composed of Al and unavoidable impurities.

Si: 6.0-13.0 Mass %

By setting the Si content in the filler metal within the above-specified range, a sufficient amount of molten filler metal can be produced during brazing heating. In case the Si content in the filler metal is less than 6.0 mass %, it becomes difficult to form robust fillets because the amount of the molten filler metal that forms and the amount of flowable filler metal are insufficient. On the other hand, in case the Si content in the filler metal is more than 13.0 mass %, coarse Si primary crystals are formed in the filler metal and molten holes tend to form in the brazing sheet. Moreover, in this case, cracks tend to occur during a rolling process of the material.

Mg: Less than 0.050 Mass %

Mg present in the filler metal tends to react with flux during brazing heating, and degradation of the brazeability at a join part or join parts, to which flux is applied, is caused. In order to improve the brazeability of join parts, it is necessary to restrict the Mg content in the filler metal to less than 0.050 mass %.

Bi: 0.004-0.20 Mass %

The filler metal may further contain Bi: 0.004-0.20 mass % as needed. In this case, brazeability can be further improved. It is noted that the functions and effects of Bi in the filler metal and the reasons for restriction are the same as those of Bi in the intermediate material.

The chemical compositions of the intermediate material and the filler metal in the brazing sheet are set in the above-mentioned ranges; in addition, the Mg content M [mass %] in the intermediate material, the thickness $t_i$ [μm] of the intermediate material, and the thickness $t_f$ [μm] of the filler metal satisfy the relation of the following formula (1).

$$t_f \geq 10.15 \times \ln(M \times t_i) + 3.7 \quad (1)$$

Formula (1) is a relational expression that was determined based on the following reasoning.

It is known that, under common flux brazing conditions, that is, under the condition that a fluoride flux containing KF and $AlF_3$ is applied in an amount of about 3-5 g/m², brazing is possible if the Mg content in the filler metal is 0.20 mass % or less. In addition, it is also known that the melting temperature of the flux is 562° C., and the effect of breaking up the oxide film is exhibited a few seconds after the beginning of the melting. The present inventors concluded, from these facts, that the flux can exert its function if the Mg concentration of the surface of the brazing sheet is 0.20 mass % or less at the time when the temperature of the join part(s) has reached 570° C.

It is conceivable that the amount of Mg that reaches the surface of the brazing sheet is determined, among the material factors, mainly depending on the amount of Mg contained in the intermediate material, the thickness of the intermediate material, and the thickness of the filler metal. Although the influence of the amount of Mg contained in the core can also be considered as a material factor, Mg in the core is required to pass through the intermediate material to reach the filler metal. Therefore, unless the amount of Mg in the core is extremely high, the influence is relatively small in the phase up to 570° C.

Further, it is conceivable that the temperature increase rate in the temperature range of 450° C. and above influences the amount of Mg as a heating factor. In case the temperature increase rate is high, the amount of Mg that reaches the surface becomes less in comparison with the case in which the temperature increase rate is low because the time required for the temperature increase becomes short. In addition, the heating conditions during brazing in mass production facilities are set such that the temperature increase time required for reaching 600° C. after having reached 450° C. is approximately 12 minutes or shorter.

Accordingly, it is conceivable that there is a possibility of avoiding an excessive reaction of the flux and Mg, regardless of the heating rate, by constituting each layer such that, at the time when the temperature of the join part(s) has reached 570° C., the Mg concentration at the surface of the brazing sheet amounts to 0.20 mass % or less at the temperature increase rate, in which the temperature increase time from 450° C. to 600° C. is 12 minutes. Based on the above reasoning, the present inventors performed diffusion simulations varying the Mg content M [mass %] in the intermediate material and the thickness $t_i$ [μm] of the intermediate material with the temperature increase time from 450° C. up to 600° C. set to 12 minutes, and calculated the thickness $t_f$ [μm] of the filler metal at which the Mg concentration at the surface of the brazing sheet became 0.20 mass % or less at 570° C. Above formula (1) is the relational expression that was determined based on the results of these numerous diffusion simulations.

In case the thickness $t_f$ [μm] of the filler metal does not satisfy above formula (1), the flux reacts with Mg and is consumed thereby because the amount of Mg that reaches the surface of the brazing sheet becomes excessively large at the time when the flux starts to melt. As a result, brazeability at the join part(s), to which the flux was applied, degrades.

The brazing sheet may have an Mg diffusion inhibiting layer or layers disposed between the intermediate material and the filler metal and/or on the outermost surface(s) of the brazing sheet. In this case, the amount of Mg that diffuses from the intermediate material to the surface of the brazing sheet can be further reduced. As a result, degradation of the brazeability caused by a reaction between Mg and the flux can be avoided more reliably.

The Mg diffusion inhibiting layer is preferably composed of an aluminum material in which Mg is restricted to less than 0.050 mass % and Si is restricted to less than 0.050 mass %. In case the amount of Mg in the Mg diffusion inhibiting layer is excessively large, there is a risk that the effect of the Mg diffusion inhibiting layer may be impaired by such Mg diffusing into the filler metal. Further, in case the amount of Si in the Mg diffusion inhibiting layer is excessively large, the diffusion rate of Mg in the Mg diffusion inhibiting layer becomes high, and there is a risk that the effect of the Mg diffusion inhibiting layer may be impaired. By setting the amounts of Mg and Si in the Mg diffusion inhibiting layer to less than 0.050 mass % and less than 0.050 mass %, respectively, the effect of the Mg diffusion inhibiting layer can be sufficiently obtained.

It is noted that, although elements other than Mg and Si may be present in the Mg diffusion inhibiting layer, elements such as Cu, etc., that have a function of lowering the melting point are not preferable from the viewpoint of avoiding an increase in the Mg diffusion rate.

The total thickness of the Mg diffusion inhibiting layer(s) is preferably 15% or less of the thickness of the filler metal. In this case, after the filler metal has melted, the Mg diffusion inhibiting layer can rapidly dissolve into the molten filler metal. As a result, the diffusion rate of Mg increases after the filler metal has melted and satisfactory brazeability can be easily ensured at the join part(s), to which flux is not applied.

In case the Mg diffusion inhibiting layer is provided, the Mg concentration at the surface of the brazing sheet at the time when the temperature of the join part(s) has reached 570° C. becomes less in proportion to its thickness. The present inventors performed diffusion simulations varying the thickness $t_m$ [μm] of the Mg diffusion inhibiting layer as well as the Mg content M [mass %] in the intermediate material and the thickness $t_i$ [μm] of the intermediate material. As a result, it was found that, when the Mg diffusion inhibiting layer is present, the Mg concentration at the surface of the brazing sheet at 570° C. can be made 0.20 mass % or less by satisfying the relation of the following formula (2). It is noted that the symbol $t_f$ in the following formula (2) represents the thickness of the filler metal [μm].

$$t_f \geq 10.15 \times \ln(M \times t_i) + 3.7 - t_m \qquad (2)$$

The brazing sheet can be made, for example, by preparing a raw sheet of each layer that constitutes this layered structure, and by clad bonding them. Furthermore, after a clad sheet of the layered structure that includes a core, an intermediate material and a filler metal has been prepared, the clad sheet may be etched with acid or alkali. In this case, a thick and tenacious oxide film, which formed on the surface of the clad sheet during the manufacturing process, can be removed and replaced with a natural oxide film. This natural oxide film is easily broken up by the flux, Mg and the like. Consequently, brazeability can be further improved.

Etching of the clad sheet may be performed at any stage prior to brazing. The etching may be performed, for example, immediately after producing the clad sheet, or may be performed after forming the clad sheet into a desired shape.

Further, after etching, a rolling oil or the like may be applied to the surface of the brazing sheet. In this case, degradation of the brazing sheet caused by oxidation of the surface of the material after etching, e.g., by condensation, etc., can be inhibited over a longer period.

In brazing that is performed using the brazing sheet, first an object to be processed is assembled that includes an aluminum structure, which includes the brazing sheet, and a fluoride-based flux, which has been applied to one section of a join part of the aluminum structure. Before applying the flux, etching of the brazing sheet may be performed as needed. In this case, brazing can be performed in which the natural oxidized film replaced owing to the etching is in a more fragile state. Consequently, brazeability can be improved more reliably.

Specific configurations of the aluminum structure are not particularly limited. For example, the aluminum structure may include a hollow member constituted from the brazing sheet and may comprise a contact portion at which adjacent filler metals are in contact with each other. As described above, in previously-known fluxless brazing methods, there was a problem in that, when the hollow member was brazed, joint defects such as fillet tearing tended to occur on its exterior.

In contrast, by using the above-described brazing sheet, brazing can be performed by applying a flux in advance to a portion or portions where fillet tearing tends to occur, such as for example, at a contact portion or contact portions of the hollow member. As a result, brazeability can be improved while taking advantage of a reduction of flux residue by using a fluxless brazing method.

The application of flux may be performed after the aluminum structure has been assembled. In addition, flux can be applied in advance to a component or components of the aluminum structure and then the aluminum structure can be assembled using these. The application amount of the flux can be set to, for example, 3-5 g/m².

After assembling the object to be processed, the object is brazed in an inert gas atmosphere. Various conditions such as the atmosphere, temperature increase rate, and brazing temperature during brazing can be suitably selected from known conditions as appropriate.

WORKING EXAMPLES

Working examples of the brazing sheet will be explained below. It is noted that embodiments of the brazing sheet, the manufacturing method of the same, and the brazing method according to the present invention are not limited to the embodiments of the following working examples, and can be modified as appropriate within a range that does not depart from the gist of the present invention.

In the present examples, the brazing sheets (Test Materials 1-31) shown in Tables 1 and 2 were prepared according to the following procedure. First, base sheets of the core, the intermediate material, the filler metal, and the Mg diffusion inhibiting layer having the chemical compositions listed in Tables 1 and 2 were prepared.

With regard to the base sheet of the core, an ingot made by continuous casting was faced so as to have a vertical dimension, a horizontal dimension, and a thickness as prescribed. It is noted that the vertical and horizontal dimensions were set to 163 mm. With regard to the base sheet of the filler metal, an ingot made by continuous casting was hot-rolled to have a prescribed thickness, and then cut to have the same vertical and horizontal dimensions as those of the base sheet of the core. With regard to the base sheets of the intermediate material and the Mg diffusion inhibiting layer, ingots made by continuous casting were hot-rolled to have a thickness of 3 mm and then cold-rolled to have the prescribed thicknesses. Thereafter, these were cut to have the same vertical and horizontal dimensions as those of the base sheet of the core.

These base sheets were stacked in the order of the layered structures listed in Tables 1 and 2 and were subjected to clad-rolling in the usual manner so as to form annealed clad sheets having a thickness of 0.4 mm. Test Materials 1-31 were prepared as described above. It is noted that each test material prepared in the present example is a so-called single-sided brazing sheet having a filler metal, etc., clad onto one side of the core.

With regard to the test materials having no Mg diffusion inhibiting layer, the values of $t_{fmin}$ [μm], which were obtained according to the following formula (1)' using the values of the Mg content M [mass %] in the intermediate material and the thickness $t_i$ [μm] of the intermediate material, are shown in Tables 1 and 2.

$$t_{fmin}=10.15\times\ln(M\times t_i)+3.7 \quad (1)'$$

Furthermore, with regard to the test materials having the Mg diffusion inhibiting layer, the values of $t_{fmin}$ [μm], which were obtained according to the following formula (2)' using the values of the Mg content M [mass %] in the intermediate material, the thickness t1 [μm] of the intermediate material, and the total thickness $t_m$ [μm] of the Mg diffusion inhibiting layer(s), are shown in Tables 1 and 2.

$$t_{fmin}=10.15\times\ln(M\times t_i)+3.7-t_m \quad (2)'$$

The $t_{fmin}$ values obtained according to the above-mentioned formulae (1)' or (2)' are values corresponding to the minimum value of the filler metal thickness that is required to make the Mg concentration at the surface of the brazing sheet amount to 0.20 mass % or less at the time when the temperature of the join part has reached 570° C. at a temperature increase rate at which the temperature increase time from 450° C. to 600° C. is 12 minutes. In case the filler metal thickness $t_f$ of each test material is more than $t_{fmin}$, the relations of the above-mentioned formula (1) or formula (2) are satisfied.

TABLE 1

| Test Material Reference | | Chemical Composition (mass %) | | | | | | Thickness | $t_{fmin}$ |
|---|---|---|---|---|---|---|---|---|---|
| Number | Layered Structure | Si | Mg | Mn | Zn | Bi | Be | (μm) | (μm) |
| 1 | Filler Metal | 10 | — | — | — | — | — | 30 | — |
|   | Core | — | — | 1.2 | — | — | — | 370 | |
| 2 | Filler Metal | 10 | — | — | — | 0.02 | — | 30 | 17.77 |
|   | Intermediate Material | — | 0.4 | — | — | — | — | 10 | |
|   | Core | — | — | 1.2 | — | — | — | 360 | |
| 3 | Filler Metal | 10 | — | — | — | 0.02 | — | 30 | 21.89 |
|   | Intermediate Material | — | 0.6 | — | — | — | — | 10 | |
|   | Core | — | 0.6 | 1.2 | — | — | — | 360 | |
| 4 | Filler Metal | 10 | — | — | — | — | — | 30 | 21.89 |
|   | Intermediate Material | — | 0.6 | — | — | — | — | 10 | |
|   | Core | — | — | 1.2 | — | — | — | 360 | |
| 5 | Filler Metal | 10 | — | — | — | 0.02 | — | 30 | 28.92 |
|   | Intermediate Material | — | 1.2 | — | — | — | — | 10 | |
|   | Core | — | — | 1.2 | — | — | — | 364 | |
| 6 | Filler Metal | 10 | — | — | — | 0.02 | — | 30 | 28.92 |
|   | Intermediate Material | 10 | 1.2 | — | — | — | — | 10 | |
|   | Core | — | — | 1.2 | — | — | — | 364 | |

TABLE 1-continued

| Test Material Reference Number | Layered Structure | Chemical Composition (mass %) | | | | | | Thickness (μm) | $t_{fmin}$ (μm) |
|---|---|---|---|---|---|---|---|---|---|
| | | Si | Mg | Mn | Zn | Bi | Be | | |
| 7 | Filler Metal | 10 | — | — | — | 0.02 | — | 40 | 36.37 |
| | Intermediate Material | — | 2.5 | — | — | — | — | 10 | |
| | Core | — | — | 1.2 | — | — | — | 350 | |
| 8 | Filler Metal | 10 | — | — | — | 0.02 | — | 40 | 31.19 |
| | Intermediate Material | — | 3 | — | — | — | — | 5 | |
| | Core | — | — | 1.2 | — | — | — | 355 | |
| 9 | Mg Diffusion Inhibiting Layer | — | — | — | — | — | — | 4 | 24.92 |
| | Filler Metal | 10 | — | — | — | 0.02 | — | 30 | |
| | Intermediate Material | — | 1.2 | — | — | — | — | 10 | |
| | Core | — | — | 1.2 | — | — | — | 356 | |
| 10 | Filler Metal | 10 | — | — | — | 0.02 | — | 30 | 24.92 |
| | Mg Diffusion Inhibiting Layer | — | — | — | — | — | — | 4 | |
| | Intermediate Material | — | 1.2 | — | — | — | — | 10 | |
| | Core | — | — | 1.2 | — | — | — | 356 | |
| 11 | Mg Diffusion Inhibiting Layer | — | — | — | — | — | — | 2 | 24.92 |
| | Filler Metal | 10 | — | — | — | 0.02 | — | 30 | |
| | Mg Diffusion Inhibiting Layer | — | — | — | — | — | — | 2 | |
| | Intermediate Material | 10 | 1.2 | — | — | — | — | 10 | |
| | Core | — | — | 1.2 | — | — | — | 356 | |
| 12 | Filler Metal | 6 | — | — | — | 0.02 | — | 30 | 28.92 |
| | Intermediate Material | — | 1.2 | — | — | — | — | 10 | |
| | Core | — | — | 1.2 | — | — | — | 364 | |
| 13 | Filler Metal | 13 | — | — | — | 0.02 | — | 30 | 28.92 |
| | Intermediate Material | — | 1.2 | — | — | — | — | 10 | |
| | Core | — | — | 1.2 | — | — | — | 364 | |
| 14 | Filler Metal | 10 | — | — | — | 0.004 | — | 30 | 28.92 |
| | Intermediate Material | — | 1.2 | — | — | — | — | 10 | |
| | Core | — | — | 1.2 | — | — | — | 364 | |
| 15 | Filler Metal | 10 | — | — | — | 0.2 | — | 30 | 28.92 |
| | Intermediate Material | — | 1.2 | — | — | — | — | 10 | |
| | Core | — | — | 1.2 | — | — | — | 364 | |
| 16 | Filler Metal | 10 | — | — | — | 0.02 | — | 30 | 28.92 |
| | Intermediate Material | 3 | 1.2 | — | — | — | — | 10 | |
| | Core | — | — | 1.2 | — | — | — | 364 | |

TABLE 2

| Test Material Reference Number | Layered Structure | Chemical Composition (mass %) | | | | | | Thickness (μm) | $t_{fmin}$ (μm) |
|---|---|---|---|---|---|---|---|---|---|
| | | Si | Mg | Mn | Zn | Bi | Be | | |
| 17 | Filler Metal | 10 | — | — | — | 0.02 | — | 30 | 28.92 |
| | Intermediate Material | 12 | 1.2 | — | — | — | — | 10 | |
| | Core | — | — | 1.2 | — | — | — | 364 | |
| 18 | Filler Metal | 10 | — | — | — | 0.02 | — | 30 | 28.92 |
| | Intermediate Material | — | 1.2 | — | 0.9 | — | — | 10 | |
| | Core | — | — | 1.2 | — | — | — | 364 | |
| 19 | Filler Metal | 10 | — | — | — | 0.02 | — | 30 | 28.92 |
| | Intermediate Material | — | 1.2 | — | 6 | — | — | 10 | |
| | Core | — | — | 1.2 | — | — | — | 364 | |
| 20 | Filler Metal | 10 | — | — | — | 0.02 | — | 30 | 17.77 |
| | Intermediate Material | — | 0.4 | — | — | — | — | 10 | |
| | Core | — | 0.2 | 1.2 | — | — | — | 360 | |
| 21 | Filler Metal | 10 | — | — | — | 0.02 | — | 30 | 17.77 |
| | Intermediate Material | — | 0.4 | — | — | — | — | 10 | |
| | Core | — | 0.8 | 1.2 | — | — | — | 360 | |
| 22 | Filler Metal | 10 | — | — | — | 0.02 | — | 30 | 28.92 |
| | Intermediate Material | — | 1.2 | — | — | — | 0.05 | 10 | |
| | Core | — | — | 1.2 | — | — | — | 364 | |
| 23 | Filler Metal | 10 | — | — | — | 0.02 | — | 30 | 28.92 |
| | Intermediate Material | — | 1.2 | — | — | 0.05 | — | 10 | |
| | Core | — | — | 1.2 | — | — | — | 364 | |
| 24 | Filler Metal | 10 | — | — | — | 0.02 | — | 30 | 10.74 |
| | Intermediate Material | — | 0.2 | — | — | — | — | 10 | |
| | Core | — | — | 1.2 | — | — | — | 360 | |
| 25 | Filler Metal | 10 | — | — | — | 0.02 | — | 30 | 41.14 |
| | Intermediate Material | — | 4 | — | — | — | — | 10 | |
| | Core | — | — | 1.2 | — | — | — | 360 | |

TABLE 2-continued

| Test Material Reference Number | Layered Structure | Chemical Composition (mass %) | | | | | | Thickness (μm) | $t_{fmin}$ (μm) |
|---|---|---|---|---|---|---|---|---|---|
| | | Si | Mg | Mn | Zn | Bi | Be | | |
| 26 | Filler Metal | 5 | — | — | — | 0.02 | — | 30 | 28.92 |
| | Intermediate Material | — | 1.2 | — | — | — | — | 10 | |
| | Core | — | — | 1.2 | — | — | — | 364 | |
| 27 | Filler Metal | 15 | — | — | — | 0.02 | — | 30 | 28.92 |
| | Intermediate Material | 10 | 1.2 | — | — | — | — | 10 | |
| | Core | — | — | 1.2 | — | — | — | 364 | |
| 28 | Filler Metal | 10 | — | — | — | 0.30 | — | 30 | 28.92 |
| | Intermediate Material | — | 1.2 | — | — | — | — | 10 | |
| | Core | — | — | 1.2 | — | — | — | 364 | |
| 29 | Filler Metal | 10 | — | — | — | 0.02 | — | 30 | 36.37 |
| | Intermediate Material | — | 2.5 | — | — | — | — | 10 | |
| | Core | — | — | 1.2 | — | — | — | 360 | |
| 30 | Mg Diffusion Inhibiting Layer | — | — | — | — | — | — | 6 | 22.92 |
| | Filler Metal | 10 | — | — | — | 0.02 | — | 30 | |
| | Intermediate Material | — | 1.2 | — | — | — | — | 10 | |
| | Core | — | — | 1.2 | — | — | — | 354 | |
| 31 | Filler Metal | 10 | — | — | — | 0.02 | — | 30 | 15.89 |
| | Mg Diffusion Inhibiting Layer | — | — | — | — | — | — | 6 | |
| | Intermediate Material | — | 0.6 | — | — | — | — | 10 | |
| | Core | — | — | 1.2 | — | — | — | 356 | |

Working Example 1

The present example is an example in which gap-filling tests were conducted using the above-mentioned test materials. The test specimens for the gap filling test (refer to FIG. 1) were prepared according to the following method. First, a horizontal sheet 2 having a width of 25 mm and a length of 60 mm was sampled from each test material. In addition to the horizontal sheet 2, a vertical sheet 3 composed of JIS A3003 alloy and having a width of 25 mm, a length of 55 mm, and a thickness of 1 mm also was prepared. After being degreased with acetone, the horizontal sheet 2 and the vertical sheet 3 were assembled as shown in FIG. 1 to prepare Test Specimen 1.

As shown in FIG. 1, the vertical sheet 3 is disposed in the direction orthogonal to the horizontal sheet 2, and one end 31 in the longitudinal direction of the vertical sheet 3 is in contact with filler metal 21 of the horizontal sheet 2. A spacer 4 composed of a stainless steel round wire having a diameter of 1.6 mm is clamped between other end 32 in the longitudinal direction of the vertical sheet 3 and the horizontal sheet 2. More specifically, the spacer 4 is spaced 55 mm apart in the horizontal direction from the location (the one end 31) where the vertical sheet 3 is in contact with the horizontal sheet 2. In addition, when Test Specimen 1 is viewed from above, the other end 32 of the vertical sheet 3 is arranged so as to be aligned with the spacer 4 and a longitudinal end portion 201 of the horizontal sheet 2.

With regard to some of the test specimens shown in Table 3, after degreasing the horizontal sheet 2 and prior to assembling the vertical sheet 3, a fluoride-based flux was applied to the surface of the filler metal 21, and dried in the air. Either one of a KF—AlF₃ based flux containing KF and AlF₃ or a CsF based flux containing CsF was used as the flux. In addition, the mass before applying the flux and the mass after applying and drying the flux were measured using an electronic scale, and the difference between them was defined as the application amount of the flux.

A nitrogen gas furnace, which was constituted from a two-chamber type furnace equipped with a preheating chamber having an internal volume of 0.4 m³ and with a brazing chamber, was used for the brazing heating. When the temperature of the test specimens reached 450° C. in the preheating chamber, the test specimens were transferred to the brazing chamber and brazed at the attained temperature 600° C. With regard to the brazing conditions, nitrogen gas was fed into each chamber of the nitrogen furnace at 30 m³/h and heated with the condition that the required time after reaching 450° C. until reaching 600° C. was approximately 12 minutes. It is noted that the oxygen concentration in the brazing chamber at the time of completion of the heating was 7-10 ppm. After the temperature of the test specimens had reached 600° C. in the brazing chamber, the test specimens were immediately transferred to the preheating chamber and cooled to 570° C. in the preheating chamber, and thereafter were taken out and cooled in the atmosphere.

The gap-filling length and the fillet appearance of each test specimen for which brazing was performed in the above-mentioned manner were evaluated. In the "Gap Filling Length" column in Table 3, the length of the filler metal 22, which filled between the horizontal sheet 2 and the vertical sheet 3 (refer to symbol L in FIG. 1) after brazing, has been recorded for each Test Specimen 1. In the "Shape of Fillet" column in Table 3, notation "A⁺" was recorded in case the fillet was uniform in shape, notation "A" was recorded in case the fillet was somewhat uneven in shape but was continuously formed, notation "B" was recorded in case the fillet was indeterminate in shape or was different in length on the right and left sides of the vertical material, and notation "C" was recorded in case the fillet was not formed or suffered obvious fillet tearing. It is noted that the states indicated by notations "B" and "C" were judged to be unacceptable as being problematic in practical use.

TABLE 3

| Specimen Reference Number | Test Material Reference Number | Etching Treatment Treatment Liquid | Etching Treatment Process Step | Flux Type | Flux Application Amount (g/m²) | Gap-Filling Length (mm) | Shape of Fillet |
|---|---|---|---|---|---|---|---|
| A1 | 1 | — | — | KF—AlF₃ based | 3 | 15 | A+ |
| A2 | 2 | 1% HF | When assembled | — | — | 12 | A |
| A3 | 2 | 1% HF | When assembled | KF—AlF₃ based | 3 | 18 | A+ |
| A4 | 2 | — | — | KF—AlF₃ based | 3 | 16 | A+ |
| A5 | 3 | 5% NaOH | When sheet made | — | — | 14 | A+ |
| A6 | 3 | — | — | KF—AlF₃ based | 3 | 14 | A+ |
| A7 | 4 | — | — | — | — | 12 | A |
| A8 | 5 | — | — | — | — | 13 | A |
| A9 | 5 | — | — | KF—AlF₃ based | 7 | 15 | A+ |
| A10 | 8 | — | — | — | — | 16 | A+ |
| A11 | 8 | — | — | KF—AlF₃ based | 7 | 13 | A |
| A12 | 8 | — | — | CsF based | 7 | 17 | A+ |
| A13 | 9 | — | — | KF—AlF₃ based | 3 | 16 | A+ |
| A14 | 10 | — | — | KF—AlF₃ based | 3 | 15 | A+ |
| A15 | 11 | — | — | KF—AlF₃ based | 3 | 15 | A+ |
| A16 | 20 | 1% HF | When sheet made | — | — | 13 | A |
| A17 | 21 | 1% HF | When sheet made | — | — | 15 | A+ |
| A18 | 21 | — | — | KF—AlF₃ based | 3 | 13 | A |
| A19 | 22 | — | — | — | — | 16 | A+ |
| A20 | 23 | — | — | — | — | 14 | A+ |
| A21 | 24 | 1% HF | When assembled | — | — | 9 | B |
| A22 | 25 | — | — | KF—AlF₃ based | 7 | 6 | C |
| A23 | 25 | — | — | CsF based | 7 | 8 | B |
| A24 | 28 | 1% HF | When assembled | — | — | 13 | B |
| A25 | 29 | — | — | KF—AlF₃ based | 7 | 8 | B |
| A26 | 30 | — | — | — | — | 6 | B |
| A27 | 31 | — | — | — | — | 9 | B |

Specimen A1 is an example in which flux brazing was performed under standard conditions. In Specimen A1, uniform fillets having a length of 15 mm could be formed by applying a KF—AlF₃ based flux onto the surface of the filler metal in an amount of 3 g/m².

From the results of Specimens A2-A20, it can be understood that Test Materials 2-5, Test Materials 8-11, and Test Materials 20-23, which respectively have the above-specified layered structures, make it possible to form fillets having no problem in practical use regardless of whether flux was applied or flux was not applied.

Specifically, Test Materials 2, 3, and 9-11 formed satisfactory fillets, which were substantially equivalent to common flux brazing (Specimen A1) under standard flux-application conditions, as shown in Specimens A3, A6, and A13-A15.

Test Material 5 formed satisfactory fillets by applying 7 g/m² of a KF—AlF₃ based flux as shown in Specimen A9.

With regard to Test Material 8, by applying 7 g/m² of a CsF based flux, the gap filling length was increased and the shape of the fillet was made more stable than by applying the KF—AlF₃ based flux as shown in Specimens A11 and A12. This can be considered to be due to the fact the KF—AlF₃ based flux and Mg tend to react in Test Material 8, in which the Mg content in the intermediate material is relatively high. Although CsF mixed-type fluxes are somewhat higher in cost, it can be considered that they effectively act not only on Test Material 8, in which the Mg content in the intermediate material is high, but also with respect to all of the brazing sheet according to the present invention. Moreover, with regard to Test Material 8, because the Mg content in the intermediate material is relatively high, satisfactory fillets formed even without etching under the condition that no flux was applied as shown in Specimen A10.

On the other hand, with regard to Test Material 24, brazeability was insufficient when flux is not applied as shown in Specimen A21, because the Mg content in the intermediate material is low.

With regard to Test Material 25, the activity of the flux was impaired even though the application amount of the flux was greater than under standard conditions, because the Mg content in the intermediate material is high. As a result, as shown in Specimen A22, obvious fillet tearing occurred when the KF—AlF₃ based flux was applied.

Moreover, with regard to Test Material 25, fillets having no problem in practical use could not be formed as shown in Specimen A23 even though a CsF based flux was applied that is less likely to react with Mg than the KF—AlF3 based flux.

In Test Material 25, the value of $t_{fmin}$ is larger than the thickness of the filler metal. Thus, it is conceivable that flux was consumed by a reaction with the Mg that had reached the surface of the filler metal, so that the wettability of the filler metal deteriorated. Furthermore, with regard to Test Material 25, it is conceivable that solid matter produced by the reaction of the flux and Mg prevented formation of fillets. Consequently, it is conceivable that the brazeability of Specimen A23 degraded for these reasons.

With regard to Test Material 28, the formation state of the fillets was uneven as shown in Specimen A24, because the Bi content in the filler metal is high. In addition, although it is not shown in the tables, the surface of the filler metal in Specimen A24 after brazing turned black in color.

With regard to Test Material 29, because the value of $t_{fmin}$ is larger than the thickness of the filler metal, fillets having no problem in practical use could not be formed even though 7 g/m² of the KF—AlF₃ based flux was applied as shown in Specimen A25.

With regard to Test Material 30, because a thick Mg diffusion inhibiting layer was disposed on the outermost surface, the Mg diffusion inhibiting layer could not be completely dissolved and thus was still present (intact) when the filler metal melted. As a result, fillet formation was inhibited as shown in Specimen A26.

With regard to Test Material 31, because a thick Mg diffusion inhibiting layer is disposed between the intermediate material and the filler metal, the timing of the Mg diffusion from the intermediate material to the surface of the brazing sheet was delayed. As a result, fillets having no problem in practical use could not be formed as shown in Specimen A27.

Working Example 2

The present example is an example in which hollow members were prepared using the above-mentioned test materials, and brazeability of the aluminum structures provided with the hollow members was evaluated. The test specimens of the present example were prepared according to the following method. Circular cups 61 shown in FIG. 2 and FIG. 3 were produced by subjecting the test materials to press working. The diameter of the cups 61 was 30 mm, and a vent hole 612 having a diameter of 5 mm was formed at the center of a bottom portion 611 of each cup 61. A flange 613 was formed on the outer periphery edge portion of the cups 61. The cups 61 were formed so as to have the filler metal located on the inner side.

Separately from the cups 61, corrugated fins 7 composed of JIS A 3003 alloy were prepared.

Figure 2:
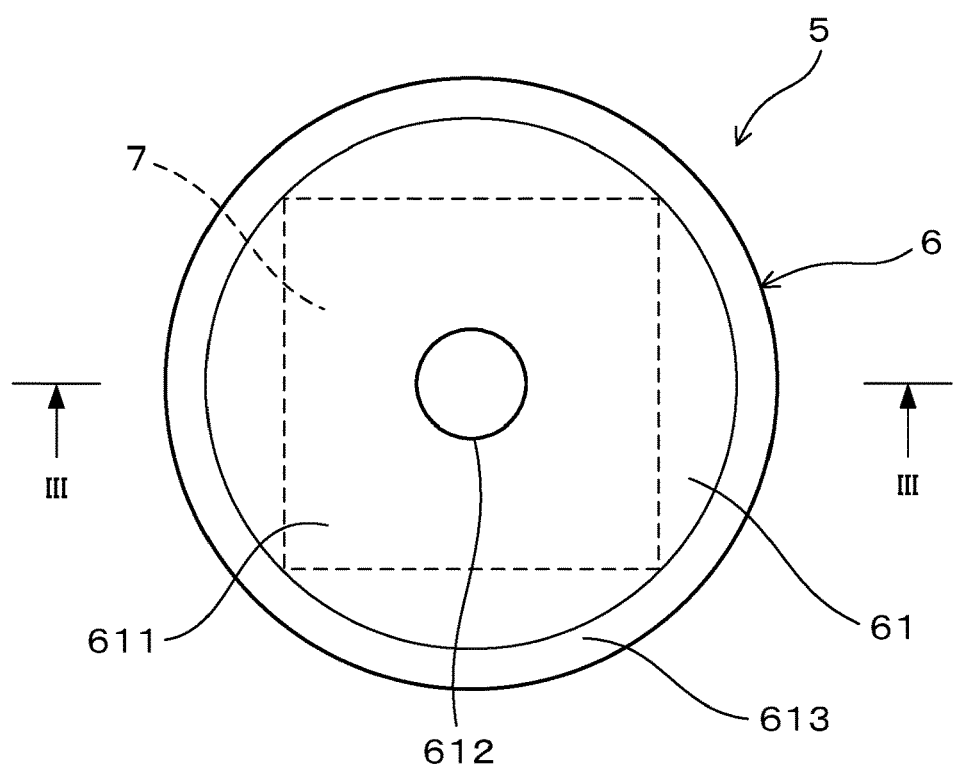
FIG. 2 is a plan view of a test specimen having a hollow member in Working Example 2.
Figure 3:
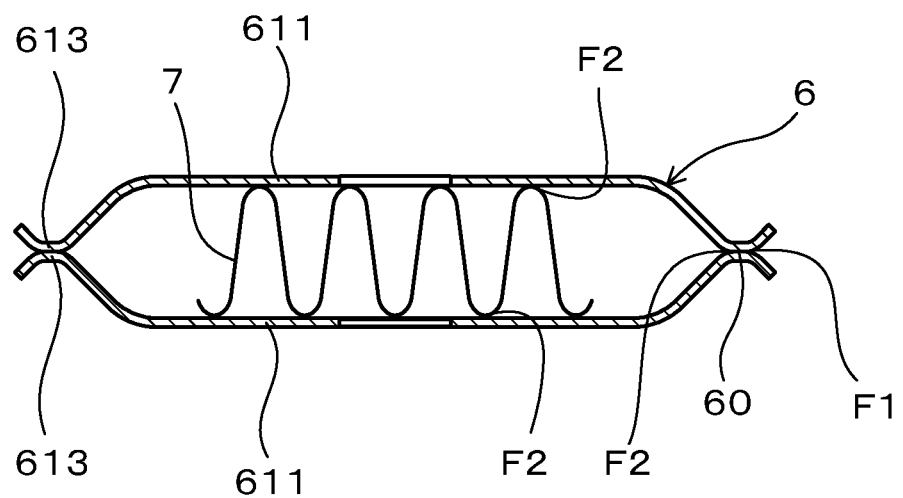
FIG. 3 is a cross-sectional view viewed along line in FIG. 2.

After degreasing the cups 61 and the corrugated fins 7, two of the cups 61 and a corrugated fin 7 were fitted together to assemble Test Specimen 5 shown in FIG. 2 and FIG. 3. Test Specimen 5 includes a hollow member 6 constituted from the two cups 61 and the corrugated fin 7 disposed inside the hollow member 6. The hollow member 6 has a contact portion 60, along which the flanges 613 of the cups 61 are in contact with each other. Furthermore, the corrugated fin 7 is in contact with the bottom portion 611 of each cup 61.

For some of the test specimens shown in Table 4 and Table 5, after being assembled and prior to being brazed, a fluoride-based flux was applied on the contact portion 60 either to the surface of the filler metal that faces the external space or to the entire contact portion 60. The application amounts of the flux were estimated by separately preparing a standard sample whose flux application amount was known, and by visually comparing the application state of the flux on the standard sample with the application states of the flux on the test samples.

These test specimens were brazed according to the same method as in Working Example 1.

The test specimens after brazing were cut, and the shapes of the exterior fillet F1 (refer to FIG. 3), which faces the external space, at the contact portion 60 as well as the interior fillets F2 (refer to FIG. 3), which are located in the interior of the hollow member 6, were visually observed. More specifically, the fillet, which faces the internal space of the hollow member 6, on the contact portion 60 and the fillets formed between the corrugated fin 7 and the bottom portion 611 are included in the interior fillets F2.

In the "Fillet Shape" columns in Table 4 and Table 5, notation "A++" was recorded in case uniform and large fillets were formed, notation "A+" was recorded in case fillets were uniform but somewhat small, notation "A" was recorded in case small fillets were continuously formed, notation "B" was recorded in case stitching occurred, and notation "C" was recorded in case no fillet was formed or obvious fillet tearing occurred. It is noted that the states indicated by notations "B" or "C" were judged to be unacceptable as being problematic in practical use.

Here, the above-mentioned "stitching" means a condition in which point-shaped recesses intermittently formed in a uniform fillet and appear like a stitch. The occurrence of stitching indicates that the break-up of the oxide film was in an intermediate stage.

TABLE 4

| Specimen Reference Number | Test Material Reference Number | Etching Treatment | | Flux | | | Shape of Fillet | |
|---|---|---|---|---|---|---|---|---|
| | | Treatment Liquid | Process Step | Type | Application Site | Application Amount (g/m²) | Exterior Fillet F1 | Interior Fillet F2 |
| B1 | 1 | — | — | KF—AlF₃ based | Entire Contact Portion | 3 | A | A++ |
| B2 | 1 | — | — | KF—AlF₃ based | Entire Contact Portion | 7 | A++ | A++ |
| B3 | 2 | 1% HF | When assembled | KF—AlF₃ based | Outside Only | 7 | A++ | A |
| B4 | 3 | 1% HF | When assembled | KF—AlF₃ based | Outside Only | 7 | A++ | A |
| B5 | 4 | 1% HF | When assembled | KF—AlF₃ based | Outside Only | 3 | A | A |
| B6 | 5 | 1% HF | When assembled | KF—AlF₃ based | Outside Only | 7 | A+ | A++ |
| B7 | 6 | 1% HF | When assembled | KF—AlF₃ based | Outside Only | 7 | A+ | A++ |
| B8 | 7 | 1% HF | When assembled | KF—AlF₃ based | Outside Only | 7 | A | A++ |
| B9 | 8 | 1% HF | When assembled | CsF based | Outside Only | 7 | A+ | A++ |
| B10 | 9 | 1% HF | When assembled | KF—AlF₃ based | Outside Only | 7 | A++ | A++ |
| B11 | 10 | 1% HF | When assembled | KF—AlF₃ based | Outside Only | 7 | A++ | A++ |
| B12 | 11 | 1% HF | When assembled | KF—AlF₃ based | Outside Only | 3 | A+ | A++ |
| B13 | 12 | 1% HF | When assembled | KF—AlF₃ based | Outside Only | 7 | A | A |
| B14 | 13 | 1% HF | When assembled | KF—AlF₃ based | Outside Only | 7 | A+ | A++ |
| B15 | 14 | 1% HF | When assembled | KF—AlF₃ based | Outside Only | 7 | A+ | A++ |
| B16 | 15 | 1% HF | When assembled | KF—AlF₃ based | Outside Only | 7 | A+ | A++ |
| B17 | 16 | 1% HF | When assembled | KF—AlF₃ based | Outside Only | 7 | A+ | A++ |
| B18 | 17 | 1% HF | When assembled | KF—AlF₃ based | Outside Only | 7 | A+ | A++ |
| B19 | 18 | 1% HF | When assembled | KF—AlF₃ based | Outside Only | 7 | A+ | A++ |
| B20 | 19 | 1% HF | When assembled | KF—AlF₃ based | Outside Only | 7 | A+ | A++ |
| B21 | 20 | 1% HF | When assembled | KF—AlF₃ based | Outside Only | 7 | A+ | A++ |
| B22 | 21 | 1% HF | When assembled | KF—AlF₃ based | Outside Only | 7 | A | A++ |
| B23 | 21 | 1% HF | When assembled | CsF based | Outside Only | 7 | A++ | A++ |
| B24 | 21 | — | — | CsF based | Outside Only | 7 | A+ | A++ |
| B25 | 22 | — | — | KF—AlF₃ based | Outside Only | 7 | A | A |
| B26 | 23 | 1% HF | When assembled | KF—AlF₃ based | Outside Only | 7 | A+ | A++ |

TABLE 5

| Specimen Reference Number | Test Material Reference Number | Etching Treatment Treatment Liquid | Etching Treatment Process Step | Flux Type | Flux Application Site | Flux Application Amount (g/m²) | Shape of Fillet Exterior Fillet F1 | Shape of Fillet Interior Fillet F2 |
|---|---|---|---|---|---|---|---|---|
| B27 | 3 | 1% HF | When assembled | — | — | — | B | A |
| B28 | 5 | 1% HF | When assembled | — | — | — | B | A++ |
| B29 | 8 | 1% HF | When assembled | — | — | — | B | A++ |
| B30 | 24 | 1% HF | When assembled | KF—AlF$_3$ based | Outside Only | 7 | A++ | B |
| B31 | 25 | 1% HF | When assembled | KF—AlF$_3$ based | Outside Only | 7 | C | A++ |
| B32 | 25 | 1% HF | When assembled | CsF based | Outside Only | 7 | B | A++ |
| B33 | 26 | 1% HF | When assembled | KF—AlF$_3$ based | Outside Only | 7 | B | B |
| B34 | 28 | 1% HF | When assembled | KF—AlF$_3$ based | Outside Only | 7 | B | A |
| B35 | 29 | 1% HF | When assembled | KF—AlF$_3$ based | Outside Only | 7 | B | A++ |
| B36 | 30 | 1% HF | When assembled | KF—AlF$_3$ based | Outside Only | 7 | B | B |
| B37 | 31 | 1% HF | When assembled | KF—AlF$_3$ based | Outside Only | 7 | A | B |

Specimen B1 is an example in which flux brazing was performed under standard conditions. In Specimen B1, the exterior fillet F1, i.e. the fillet formed on the section of the contact portion 60 that faces the external space, was smaller than the interior fillets F2. As shown in Specimen B2, the exterior fillet F1 can be improved in common flux brazing by making the application amount of flux greater than the standard amount.

In contrast, Test Materials 2-23, which have the above-specified layered structures, make it possible to form fillets having no problem in practical use on both the exterior and interior of the hollow member 6 by applying flux to at least the section of the contact portion 60 that faces the external space, as can be understood from the results of Specimens B3-B26.

Among these test materials, in particular with regard to Test Material 9 and 10, which have the Mg diffusion inhibiting layer, it was possible to improve the formation state of the exterior fillet F1 as shown in Specimens B10 and B11 in comparison with Test Material 5 that has the same configuration as Test Materials 9 and 10 except for having no Mg diffusion inhibiting layer.

Further, with regard to Test Material 11 that has Mg diffusion inhibiting layers on both sides of the filler metal, it was possible to form the exterior fillet F1 in a generally satisfactory state even though the application amount of flux was reduced to 3 g/m2, as shown in Specimen B12.

On the other hand, as shown in Specimens B27-B29, stitching occurred on the exterior fillet F1 when the hollow member was brazed without using a flux even in brazing sheets having the above-specified layered structure (Test Material 3, Test Material 5 and Test Material 8).

In Test Materials 24-31 that did not have the above-specified layered structures, it was not possible to form fillets having no problem in practical use on at least one of the exterior fillet F1 and the interior fillets F2.

Working Example 3

The present example is an example that evaluated the corrosion resistance of the brazing sheet after the completion of the brazing. In the present example, test specimens having a length of 150 mm and a width of 50 mm, which were sampled from the test materials, were suspended in a brazing furnace such that the longitudinal direction thereof was parallel to the vertical direction, and were brazed under the same conditions as in Working Example 1. After completion of the brazing, the lower part of the specimen on which the molten filler metal pooled was excised.

Thereafter, a salt spray test was conducted according to a method that complied with JIS Z2371. The test conditions were set as: test liquid: a 5% sodium chloride aqueous solution, pH: 6.8, and test temperature: 35° C. Corroded portions generated after the test were subjected to cross-sectional observation to evaluate corrosion resistance. In the "Corrosion Resistance" column in Table 6, notation "A'" was recorded in case the corrosion resistance was exceptionally satisfactory, and notation "A" was recorded in case the corrosion resistance was satisfactory.

TABLE 6

| Specimen Reference Number | Test Material Reference Number | Flux Type | Flux Application Amount (g/m²) | Corrosion Resistance |
|---|---|---|---|---|
| C1 | 1 | KF—AlF$_3$ based | 3 | A |
| C2 | 4 | — | — | A |
| C3 | 5 | — | — | A |
| C4 | 5 | KF—AlF$_3$ based | 3 | A |
| C5 | 5 | KF—AlF$_3$ based | 7 | A |
| C6 | 5 | CsF based | 7 | A |
| C7 | 18 | — | — | A+ |
| C8 | 18 | KF—AlF$_3$ based | 7 | A+ |
| C9 | 18 | CsF based | 7 | A+ |
| C10 | 19 | — | — | A+ |
| C11 | 19 | KF—AlF$_3$ based | 7 | A+ |
| C12 | 19 | CsF based | 7 | A+ |

As can be understood from Table 6, Test Materials 4-5 and 18-19, which have the above-specified layered structures, exhibited the same level of corrosion resistance as in standard flux brazing (Specimen C1) regardless of whether flux was applied or was not applied.

Further, with regard to Test Materials 18 and 19, which contained Zn in the intermediate material, corrosion resistance was further improved by the sacrificial anti-corrosive effect of Zn.

The invention claimed is:

1. A brazing sheet applicable to brazing performed in an inert gas atmosphere both using flux and without using flux, the brazing sheet comprising:
    a core composed of aluminum or an aluminum alloy;
    an intermediate material layered on the core and being composed of an aluminum alloy that contains Mg: 0.40-3.0 mass %; and
    a filler metal layered on the intermediate material and being composed of an aluminum alloy that contains Si: 6.0-13.0 mass %, and Mg: less than 0.050 mass %,
    wherein the brazing sheet satisfies the relation of below formula (1) where M [mass %] is the Mg content in the intermediate material, ti [μm] is the thickness of the intermediate material, and tf [μm] is the thickness of the filler metal:

$$tf \geq 10.15 \times \ln(M \times ti) + 3.7 \tag{1}$$

2. The brazing sheet according to claim 1, wherein the filler metal further contains Bi: 0.004-0.20 mass %.

3. The brazing sheet according to claim 1, wherein the intermediate material further contains Si: 3.0-12.0 mass %.

4. The brazing sheet according to claim 1, wherein the intermediate material further contains Zn: 0.90-6.0 mass %.

5. The brazing sheet according to claim 1, wherein the intermediate material further contains at least one of Be: 0.050-0.20 mass % and Bi: 0.050-0.30 mass %.

6. The brazing sheet according to claim 1, wherein the core is composed of an aluminum alloy that contains Mg: 0.20-0.80 mass %.

7. The brazing sheet according to claim 1, further comprising an Mg diffusion inhibiting layer disposed between the intermediate material and the filler metal and/or on an outermost surface of the brazing sheet,
  wherein the Mg diffusion inhibiting layer is composed of aluminum or an aluminum alloy, in which Mg is less than 0.050 mass % and Si is less than 0.050 mass %, and
  the total thickness of the Mg diffusion inhibiting layer(s) is 15% or less with the thickness of the filler metal being 100%.

8. A method for manufacturing the brazing sheet according to claim 1, comprising:
  preparing the brazing sheet by clad bonding the core, the intermediate material and the filler metal according to claim 1; and
  etching the brazing sheet with acid or alkali.

9. A brazing method, comprising:
  preparing an object to be brazed that includes an aluminum structure having at least one brazing sheet according to claim 1 such that the object to be brazed has at least one part where a brazed joint will be formed after brazing,
  applying a fluoride-based flux to a portion, but not all, of the at least one part where the brazed joint will be formed, and
  brazing the object in an inert gas atmosphere to form the brazed joint.

10. The brazing method according to claim 9, wherein the aluminum structure before being subjected to the brazing includes a hollow member constituted from the brazing sheet and having a contact portion at which the filler metals are in contact with each other, the contact portion being said at least one part where the brazed joint will be formed after brazing.

11. The brazing method according to claim 9, wherein prior to preparing the object to be brazed using the brazing sheet, the brazing sheet is etched with acid or alkali.

12. The brazing method according to claim 11, wherein the aluminum structure includes a hollow member at least partially constituted by the brazing sheet and having a contact portion at which the filler metals are in contact with each other, the contact portion being said which the filler metals are in contact with each other, the contact portion being said at least one part where the brazed joint will be formed after brazing.

13. The brazing method according to claim 12, wherein:
  the contain portion includes at least one first contact portion, at which a first brazed joint will form on an exterior surface of the hollow member after brazing, and at least one second contact portion, at which a second brazed joint will form on an interior surface of the hollow member after brazing; and
  the fluoride-based flux applied is applied to only the exterior surface of the at least one first contact portion and no fluoride-based flux applied is applied either to: (a) an interior surface of the at least one first contact portion or (b) the at least one second contact portion.

14. The brazing sheet according to claim 2, wherein the core is composed of an aluminum alloy that contains Mg: 0.20-0.80 mass %.

15. The brazing sheet according to claim 2, wherein the intermediate material further contains Zn: 0.90-6.0 mass %.

16. The brazing sheet according to claim 2, further comprising an Mg diffusion inhibiting layer disposed between the intermediate material and the filler metal,
  wherein the Mg diffusion inhibiting layer is composed of an aluminum alloy, in which Mg is less than 0.050 mass % and Si is less than 0.050 mass %, and
  the Mg diffusion inhibiting layer has a thickness that is 15% or less of the thickness of the filler metal.

17. The brazing sheet according to claim 2, further comprising an Mg diffusion inhibiting layer disposed on an outermost surface of the brazing sheet,
  wherein the Mg diffusion inhibiting layer is composed of an aluminum alloy, in which Mg is less than 0.050 mass % and Si is less than 0.050 mass %, and
  the Mg diffusion inhibiting layer has a thickness that is 15% or less of the thickness of the filler metal.

* * * * *